United States Patent
Scheips et al.

(10) Patent No.: US 10,406,872 B2
(45) Date of Patent: Sep. 10, 2019

(54) TRAILER COUPLING COMPRISING A SENSOR

(71) Applicant: Westfalia-Automotive GmbH, Rheda-Wiedenbruck (DE)

(72) Inventors: Rene Scheips, Bielefeld (DE); Bernhard Sielhorst, Rheda-Wiedenbruck (DE)

(73) Assignee: WESTFALIA-AUTOMOTIVE GMBH, Rheda-Wiedenbruck (DE)

( * ) Notice: Subject to any disclaimer, the term of this patent is extended or adjusted under 35 U.S.C. 154(b) by 93 days.

(21) Appl. No.: 15/513,226

(22) PCT Filed: Sep. 22, 2015

(86) PCT No.: PCT/EP2015/071737
§ 371 (c)(1),
(2) Date: Mar. 22, 2017

(87) PCT Pub. No.: WO2016/046205
PCT Pub. Date: Mar. 31, 2016

(65) Prior Publication Data
US 2017/0305215 A1    Oct. 26, 2017

(30) Foreign Application Priority Data
Sep. 22, 2015  (DE) .................... 10 2014 013 812

(51) Int. Cl.
*B60D 1/24*    (2006.01)
*B60D 1/06*    (2006.01)
(Continued)

(52) U.S. Cl.
CPC ............... *B60D 1/248* (2013.01); *B60D 1/06* (2013.01); *B60D 1/62* (2013.01); *G01L 1/127* (2013.01); *G01L 1/14* (2013.01)

(58) Field of Classification Search
CPC ........... B60D 1/248; B60D 1/06; G01L 1/127
See application file for complete search history.

(56) References Cited

U.S. PATENT DOCUMENTS 3,990,032 A * 11/1976 Fish ........................ B60D 1/248
                                                                    338/5
5,853,186 A * 12/1998 Gentner ................. B60D 1/246
                                                                    280/491.3
(Continued)

FOREIGN PATENT DOCUMENTS

DE         4419673        12/1995
DE         10154736        5/2003
(Continued)

*Primary Examiner* — Anne Marie M Boehler
*Assistant Examiner* — Michael R Stabley
(74) *Attorney, Agent, or Firm* — Hoffmann & Baron, LLP

(57) ABSTRACT

A trailer coupling for a motor vehicle for attaching a trailer or for supporting a load carrier, including a coupling arm provided for coupling a coupling piece of the trailer or load carrier, and at least one sensor arranged on the coupling arm for detecting a deformation of the coupling arm caused by a load on the coupling arm. For the trailer coupling, at least one recess is provided on an outer circumferential contour of the coupling arm, in which or on which recess the at least one sensor is arranged or held.

18 Claims, 4 Drawing Sheets

(51) Int. Cl.
 *B60D 1/62* (2006.01)
 *G01L 1/12* (2006.01)
 *G01L 1/14* (2006.01)

(56) References Cited

U.S. PATENT DOCUMENTS

| | | | | |
|---|---|---|---|---|
| 6,053,521 | A * | 4/2000 | Schertler | B60D 1/06 |
| | | | | 280/422 |
| 6,705,684 | B1 * | 3/2004 | Garvey | B60T 7/20 |
| | | | | 188/112 A |
| 8,966,998 | B2 * | 3/2015 | Gentner | B60D 1/248 |
| | | | | 73/862.621 |
| 2002/0020988 | A1 * | 2/2002 | Kleb | B60D 1/06 |
| | | | | 280/507 |
| 2005/0160837 | A1 * | 7/2005 | Tellenbach | G01G 3/1402 |
| | | | | 73/862.625 |
| 2006/0071448 | A1 * | 4/2006 | Craig | B60D 1/06 |
| | | | | 280/511 |
| 2006/0290102 | A1 * | 12/2006 | VanBuskirk, Jr. | B60D 1/58 |
| | | | | 280/511 |
| 2009/0093928 | A1 * | 4/2009 | Getman | B60T 8/1755 |
| | | | | 701/37 |
| 2009/0120211 | A1 * | 5/2009 | Roovers | B62M 6/50 |
| | | | | 73/862.474 |
| 2012/0024081 | A1 * | 2/2012 | Baker | B60D 1/06 |
| | | | | 73/862.338 |
| 2012/0130589 | A1 * | 5/2012 | Riehle | B60D 1/01 |
| | | | | 701/36 |
| 2013/0001924 | A1 * | 1/2013 | Adamczyk | B60D 1/065 |
| | | | | 280/511 |
| 2013/0091962 | A1 * | 4/2013 | Gentner | B60D 1/248 |
| | | | | 73/862.625 |
| 2013/0253814 | A1 * | 9/2013 | Wirthlin | G01G 19/02 |
| | | | | 701/124 |
| 2014/0195124 | A1 * | 7/2014 | Wellhoefer | B60D 1/248 |
| | | | | 701/48 |
| 2015/0069737 | A1 * | 3/2015 | McAllister | B60D 1/62 |
| | | | | 280/511 |
| 2017/0015163 | A1 * | 1/2017 | Sielhorst | B60D 1/06 |

FOREIGN PATENT DOCUMENTS

| | | |
|---|---|---|
| DE | 102010029414 | 12/2011 |
| EP | 1199547 | 4/2002 |
| EP | 2363307 A2 | 9/2011 |
| EP | 2452839 | 5/2012 |
| EP | 2567837 | 3/2013 |

* cited by examiner

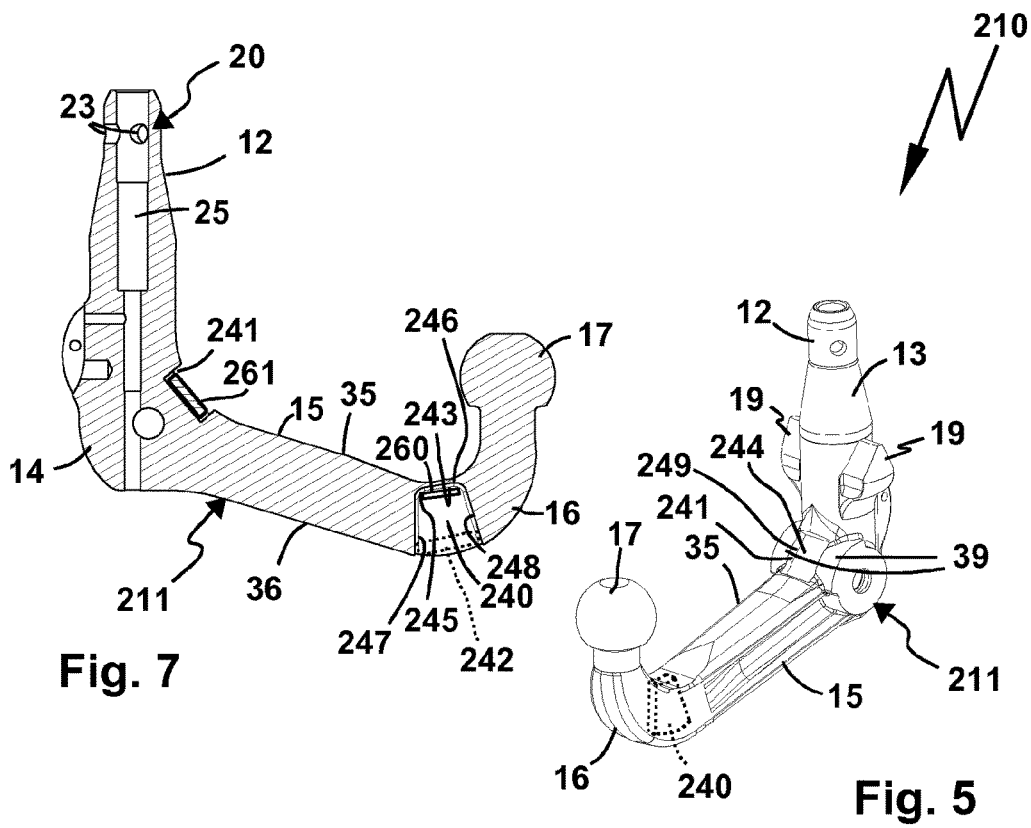
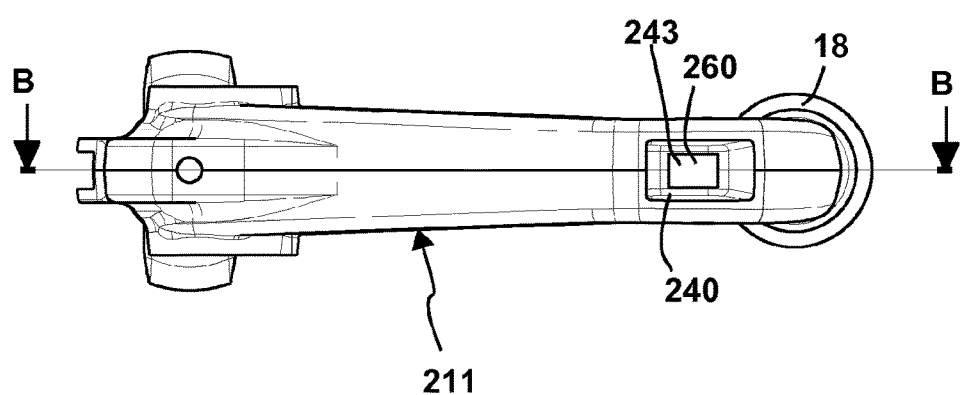

TRAILER COUPLING COMPRISING A SENSOR

This application claims priority based on an International Application filed under the Patent Cooperation Treaty, PCT/EP2015/071737, filed Sep. 22, 2015, which claims priority to DE102014013812.7, filed Sep. 23, 2014.

BACKGROUND OF THE INVENTION

The invention relates to a trailer coupling for a motor vehicle for attaching a trailer or supporting a load carrier, with a coupling arm provided with a coupling element for coupling-on the trailer or load carrier, and at least one sensor mounted on the coupling arm for detecting a deformation of the coupling arm due to a load acting on the coupling arm.

For detecting loads acting on a trailer coupling, it has been known for some time, from DE 10 2012 021 352 A1 amongst others, to affix for example strain gauges to the body of the coupling arm. If the coupling arm is stretched or compressed, the affixed strain gauge is likewise deformed with it, leading to the sensor (strain gauge) emitting a signal representing the deformation. With the aid of this measuring signal, a nose weight or a tensile load may be determined.

If such a sensor no longer functions, for example because it is damaged, it must be removed, which is time-consuming, and replaced by another sensor. A fresh calibration then begins, so that the measured results supplied by the sensor are accurate.

SUMMARY OF THE INVENTION

The problem of the invention is therefore to provide an improved trailer coupling with a sensor for detecting deformation of the coupling arm by a load acting on the coupling arm.

To solve the problem it is provided, for a trailer coupling of the type described above, that there is provided on an outer peripheral contour of the coupling arm at least one recess, in or on which the sensor or sensors is or are mounted or held.

It is a basic principle of the present invention that there is dedicated provision of at least one recess for the sensor or sensors. The recess creates for example improved protection for the sensor, since the latter does not protrude, or at any rate not so far, from the external contour of the coupling arm in the area of the recess. The sensor, for example a sensor housing surrounding the sensor, is thereby less exposed to the risk of damage.

The outer peripheral contour of the coupling arm may well also be without recesses, for example between reinforcing ribs. Such recesses may be used intrinsically for sensors, also in connection with a trailer coupling according to the invention. For the purposes of the invention however, a recess is provided especially for the sensor and for example by means of a hollowing out, for example a bored hole or milling out, made in the body or core of the coupling arm.

It should be understood that several recesses and several sensors may be provided. Furthermore, a recess may have sections of varying depth. Also, in any particular recess, several sensors may be provided, for example sensors based on different measuring principles. Thus for example to improve measurement quality, a capacitive sensor and a strain gauge may provided in one particular recess.

The motor vehicle may incidentally be a motor vehicle with an internal combustion engine, an electric motor, or both.

The sensor or sensors is or are preferably in the form of a sensor module. An essentially independent invention is represented by a sensor module for a trailer coupling for a motor vehicle which has a coupling arm for attaching a trailer or for supporting a load carrier, wherein the sensor module has at least one sensor mounted on the coupling arm for detecting a deformation of the coupling arm due to a load acting on the coupling arm, in which it is provided that the sensor module has an outer peripheral contour which is matched to at least one inner peripheral contour of a recess provided on an outer peripheral contour of the coupling arm, in or on which the sensor or sensors is or are mounted or held.

The sensor module thus forms a unit which may be mounted on the coupling arm. The outer peripheral contour of the sensor module, for example a housing of the sensor module, fits into or towards the inner peripheral contour of the recess on the coupling arm, for example for form-fitting location.

It is however also possible that for example through holes for screws or similar mounting bolts correlate with corresponding locations or openings, for example screw threads or screw sockets, on or in the recess of the coupling arm, so that the sensor module may be screwed on to the trailer coupling and coupling arm respectively.

A further advantageous aspect is revealed when the sensor module has a sensor housing in which the sensor or sensors is or are mounted. The sensor housing may also include sensor parts which, during fitting of the sensor module to the coupling arm, make individual contact with the coupling arm, for example a first sensor part and a second sensor part. Despite being mounted in the sensor housing, the sensor parts may expediently be moved relatively towards one another during deformation of the coupling arm, so that they may be at different distances from one another and in this way deformation of the coupling arm may be determined by the sensor module by means of a suitable distance measurement, for example capacitive, optical or inductive.

The coupling arm may be mounted securely, i.e. permanently, on a vehicle mounting which is or may be fixed to the motor vehicle, for example screwed or welded to it. Also possible is a plug connection between coupling arm and vehicle mounting. Finally, the coupling arm may also be mounted movably on the vehicle mounting, for example capable of swiveling with the aid of a swivel bearing and/or capable of sliding movement via a sliding bearing.

Provided expediently at the free end section of the coupling arm is a coupling element, for example a coupling ball or also another moulded part suitable for the attaching of a trailer. Of course the coupling element may also be suitable for coupling-on a load carrier, i.e. the coupling arm according to the invention may also have provision for supporting a load carrier. In this case, for example, a plug-in projection or a plug-in socket is provided at the free end section of the coupling arm.

The recess may be of varying design, i.e. it may for example comprise a through hole passing through the coupling arm. But also a blind hole or a pocket or a trough or the like may be provided as recess. The recess may, but does not have to be, cylindrical.

The recess includes for example a location in which the sensor is held at least partly. The recess may however also as it were be less deep, i.e. the sensor protrudes at least a short distance from the recess, i.e. despite the recess it protrudes somewhat from the external contour of the coupling arm into the surrounding area.

The recess or recesses is or are dedicated for the sensor or sensors, i.e. a recess subsequently made in the coupling arm, for example a drilled hole or hollowing out. Moreover the recess may also be made for example by providing that, during casting, a suitable projection of the mould protrudes into the area of the cavity for the coupling arm. At any rate the recess is not expediently formed by attaching the sensor for example between reinforcing ribs protruding from the base body of the coupling arm, but instead in a specially provided recess returning from the external contour, for example a round or polygonal external contour, of the coupling arm.

It is preferred for the recess or recesses to have an internal contour corresponding with the external contour of the sensor, for form-fitting location of the sensor. The internal contour may hold the sensor positively as a whole. It is however also possible for the internal contour to have positively holding sections, i.e. to have positively holding internal contour sections acting on corner areas of the sensor and holding the sensor positively at those points.

It is also advantageous for the sensor or sensors to be protected against environmental influences by a cover which covers the recess at least partly or in its entirety. For example a wall section of the coupling arm may protrude beyond the recess. The sensor may for example be inserted into the recess from one side and at the same time come under the cover, for example a top panel. It is however also possible that a lid is provided which, after the sensor has been inserted in the recess, is fixed over the recess, so protecting the sensor. The sensor is preferably encapsulated or enclosed in the recess. Thus, the coupling arm and the aforementioned lid expediently form encapsulation for the sensor.

The aforementioned lid may for example be used to clamp the sensor against the surface of the coupling arm in the area of the recess. The lid may for example press on the sensor, thus clamping it into the recess.

An advantageous measure is represented by the clamping of the sensor or sensors to the surface of the coupling arm in the area of the recess. This may be effected for example by means of latching or wedging. By way of example the sensor or sensors is or are wedged into the recess by a clamping element, for example a wedge. However a screw connection, as shown in the drawing, also represents an advantageous measure.

For example the sensor may be designed, as it were, as a thrust bearing or tie rod, which is clamped in the recess by screws. The screws may for example pass through the sensor and be screwed into the coupling arm, where further recesses are provided for the screws. It is however also possible for the sensor to be accommodated in a recess holding the sensor as in a pocket or other form of recess, as it were, with screws inserted in the sensor from outside, as it were, namely penetrating the coupling arm. Instead of screws of course, other in particular pin-like clamping elements may be provided.

In an advantageous embodiment it is provided that the relevant connecting element clamps the sensor roughly at right-angles to the respectively assigned contact face of the coupling arm.

A further measure may provide for the sensor or sensors to be bonded to the surface of the coupling arm in the area of the recess. While such a measure may indeed make it more difficult to replace the sensor as required, it can however improve the hold of the sensor to the surface of the coupling arm.

The sensor may be multi-part. i.e. having for example a first sensor part and a second sensor part (further sensor parts are possible), each connected to the coupling arm, i.e. its surface, at a distance from one another, and making a relative movement towards one another during deformation of the coupling arm. For example the sensor parts are clamped to the surface of the coupling arm. If therefore the relevant surface sections, to which in each case one of the sensor parts is connected, make relative movements towards one another owing to deformation of the coupling arm, the sensor parts accompany this movement. Here it is possible for a measurement, one-dimensional as it were, to be made, i.e. a pure distance measurement between the two sensor parts.

The sensor parts may be mounted in a protective housing or sensor housing.

It is possible for the sensor to be in contact with the coupling arm between the sensor parts. However it is also quite possible to have no mobility of the sensor parts relative to one another, or only contact providing little interference between the sensor and the surface of the coupling arm, even between the sensor parts.

The sensor parts are preferably discrete and not connected to one another.

It is possible that the sensor parts stand quite freely. It is however also possible for the sensor parts to be mounted in a sensor housing, but to be movable within the sensor housing. Also possible is for the sensor housing to have mobility between the sensor parts, for example to be telescopic or deformable.

For example the sensor parts have capacitive surfaces lying opposite one another. It is however also possible for one sensor part to engage with a projection in the other sensor part, leading to different capacitances, which may be measured electrically, between the two sensor parts. Naturally, other methods of measurement may also be used between the sensor parts, for example other types of distance measuring methods, for example optical measurement, measurement by ultrasound, radar or the like.

It is also possible for the sensor parts to be connected to one another by at least one sensor element. The sensor element is for example a strain gauge. But other parts, for example piezo-elements, which are able to undergo deformation and provide a sensor signal on the basis of the deformation, are readily conceivable.

A preferred embodiment of the invention provides for at least two recesses on the coupling arm, at a distance from one another. The two recesses may extend away from a recess, as it were large, in which for example a sensor housing or a sensor element of the sensor, as it were the measuring system or the sensor as such, is accommodated. The sensor is connected to the coupling arm in or on each of the recesses by a connecting area or a connecting element, for example a latching projection, a bolt (for example a screw) or the like. The connection may also for example be an adhesive bond. It is possible for one or both of the recesses to have for example a screw thread or a bore or through hole or a blind hole for a screw or bolt.

If therefore the two recesses on the coupling arm undergo a relative movement towards one another or move relative to one another, the sensor or sensors is or are actuated. For example the sensor is anchored in the recesses. The recesses make it possible for the sensor to measure as it were not only on the surface of the coupling arm, but also somewhat deeper. Moreover, the sensor is in this way held securely on the coupling arm.

As mentioned above, expediently there is a location or a holder for a sensor housing of the sensor between the recesses. The holder may protrude from the surface of the coupling arm but still provide protection for the sensor. It is however also possible for the location or holder for their part to be in the form of a recess, for example as a kind of trough or the like. In this way the sensor is recessed relative to the surface or external contour of the coupling arm and therefore accommodated on the coupling arm in a protected manner.

A further benefit of the invention is obtained due to the fact that the sensor, because of the recess or recesses, is able to measure as it were not only on the surface of the coupling arm, but is also able to detect areas of the coupling arm lying further inwards. The sensor thus forms a kind of probe or probes which, on account of the recess or recesses, can measure further inside, in the core area of the coupling arm. A screw or a bolt, for example, may be considered as such a probe, protruding from the sensor or sensor housing and engaging in the coupling arm.

The recess or a recess extends expediently from the outer peripheral contour of the coupling arm as far as a central area of the coupling arm in the area of the recess. The sensor is connected to the coupling arm, for example wedged or bonded, in the section extending into the central area, for example at the base area of a blind hole or a through hole, so that a deformation of the coupling arm leads to actuation of the sensor or sensors. If therefore for example threaded bolts or the like extend from the sensor housing into, as it were, the heart or central area of the coupling arm, and the coupling arm is deformed, it actuates the threaded bolt or other connecting elements, which for their part, in turn, transmit this actuating force to the sensor, resulting in actuation of the latter. For example such recesses or one of them reach or reaches as far as a centre of a cross-section of the coupling arm.

A connecting element of the coupling arm, which is in contact with the surface of the coupling arm in the recess or in a recess, may also form an actuating lever to actuate the sensor or sensors. For example a bolt or holding pin which protrudes from the sensor, in particular its sensor housing, and engages in the coupling arm, is actuated like a lever as it were by a deformation of the coupling arm, and at the same time actuates the sensor, for example stretching or compressing a strain gauge or also moving the aforementioned sensor parts relatively towards one another, which for example allows a capacitive and/or inductive and/or optical measurement or other similar distance measurement.

In the area of a neutral phase or neutral fibre of the coupling arm, no or only a few deformations may as a rule be measured. It is therefore preferred if the sensor or sensors are provided to detect a deformation of the knee-joint bar outside the neutral phase or neutral fibre of the coupling arm. It is preferred if the recess indeed extends inwards into the coupling arm from the external contour or outer surface of the coupling arm, but in this case deeply enough that the greatest possible area of the coupling arm deformed under load may be measured.

In a preferred measure, the recess and the sensor or sensors are provided on a curved section of the coupling arm. For example the recess may be provided on an inside radius or an outside radius of the curve or the curved section. When the coupling arm is loaded, the curved section is deformed in a particular way, i.e. its radius is enlarged or reduced. The sensor system then acts preferably at this point.

Besides the aforementioned protection of the sensor by the recess, a further advantageous aspect is that, in the area of the recess, the cross-section of the coupling arm which may be mechanically loaded is reduced. Consequently, due to the recess or recesses, the mechanical loadability of the coupling arm in the area of the recess is reduced. Because of this, at the point of the recess, the coupling arm is deformed to a greater extent than without the presence of the recess, which is correspondingly better detected by the sensor located there.

An advantageous measure provides for the sensor or sensors to measure relative movements between wall sections of the recess.

Edge areas of the recess or recesses lying opposite one another are expediently joined together by the sensor or sensors or by a wall carrying the sensor. If then the edge areas move relatively towards one another, they actuate in this way the sensor or the wall. The sensor mounted on the wall then measures the movement of the wall, for example its deformation. A variant may here provide for the wall and/or the sensor to be in the form of a membrane, i.e. to have a significantly smaller second sensor part than the coupling arm in the environment. As a result of this, a deformation of the coupling arm in the area of the wall or the sensor joining the edge areas together may be especially strong. The wall which joins the edge areas to one another is expediently integral with the coupling arm. For example the wall may be the base of a blind hole.

The wall surface which carries the sensor or on which the sensor is mounted may be for example an outer wall surface of the coupling arm, up to which the recess extends, for example from the opposite outer wall of the coupling arm.

At this point it should be noted that the wall carrying the sensor, or the sensor connecting the edge areas to one another, may be connected only in certain areas, i.e. not over the entire outer periphery, with the edge areas of the recess. A variant may however also provide for the sensor or the wall to be connected, in particular for a short distance on the outer periphery with the inside of the recess, i.e. the edge areas.

By way of example for various measuring principles of the sensor, a number may be mentioned here.

The sensor or sensors may for example have a capacitive sensor element. Consequently the sensor or sensors may therefore for example comprise a capacitive sensor. Also advantageous is an inductive measuring system. The sensor includes for example at least one inductive sensor element. A strain gauge is also advantageously suited to be a sensor. Moreover, various methods of distance measurement are conceivable. If therefore the sensor includes a distance sensor, for example an optical sensor or the like, it is also able to measure the deformation of the coupling arm.

It is preferred for the sensor or sensors to have a sensor housing, in which a sensor element or a sensor surface is mounted, protected from environmental influences. For example a strain gauge may be mounted, with protection, in the housing. but capacitive measuring surfaces too, for example the aforementioned sensor parts, are advantageously accommodated with protection in such a sensor housing.

Other components may also be mounted in the sensor housing, such as for example an evaluation unit which processes the signal of the sensor element, for example amplifying or filtering it. The evaluation unit may therefore for example filter interference, in particular vibrations. The evaluation unit may however also be mounted outside the sensor housing or next to the sensor element.

It is also advantageous for the sensor to have a transmission unit for transmission of its sensor signal to the vehicle power supply or to a trailer coupling control device. The transmission unit may be designed for example for wire-bound or wireless transmission of the sensor signal, for example for radio transmission.

The recess may have a long elongated shape, for example substantially linear along an imaginary line. It is however also possible for the recess to be curved, i.e. for example to have a curved path. The curved path may be matched to the correspondingly curved path of the coupling arm in the area of the recess.

Furthermore it is expedient if the recess or recesses has or have an elongated shape and extends or extend along an axial direction of the coupling arm in the area of the recess, or at an angle, in particular at an obtuse angle, to this axial direction of the coupling arm. Consequently the measuring range of the sensor in or at the recess is, as it were, especially long.

The recess communicates expediently with a location, for example a screw socket or a bore, for a mounting bolt holding the sensor in the recess. Consequently, for example, a mounting section, for example a latching hook or pin extending away from the sensor, for example its sensor housing, is therefore able to engage in this location.

It is also expedient if the recess communicates with a bore or other channel, for example also a groove open at the side, which is designed to hold a line leading to the sensor. So, for example, a line for electrical power supply and/or for electrical and/or optical transmission of the sensor signal of the sensor may be provided in the channel, groove or other bore. The line connects for example the sensor with an evaluation unit, a trailer control device and/or the vehicle power supply.

It has already been explained that the recess may also include a screw socket for screwing the sensor to the coupling arm, or also a latching location for latching the sensor to the coupling arm.

The recess expediently has contact faces for the sensor. The contact faces are expediently flat or smooth surfaces. The sensor is clamped to the contact faces expediently with a vertical force direction or a force direction acting substantially vertically.

BRIEF DESCRIPTION OF THE DRAWINGS

The invention will be explained in detail below with the aid of typical embodiments. The drawing shows in:

FIG. 9 a second perspective view of a fourth coupling arm, of which

DETAILED DESCRIPTION OF THE PREFERRED EMBODIMENTS

Figure 1:
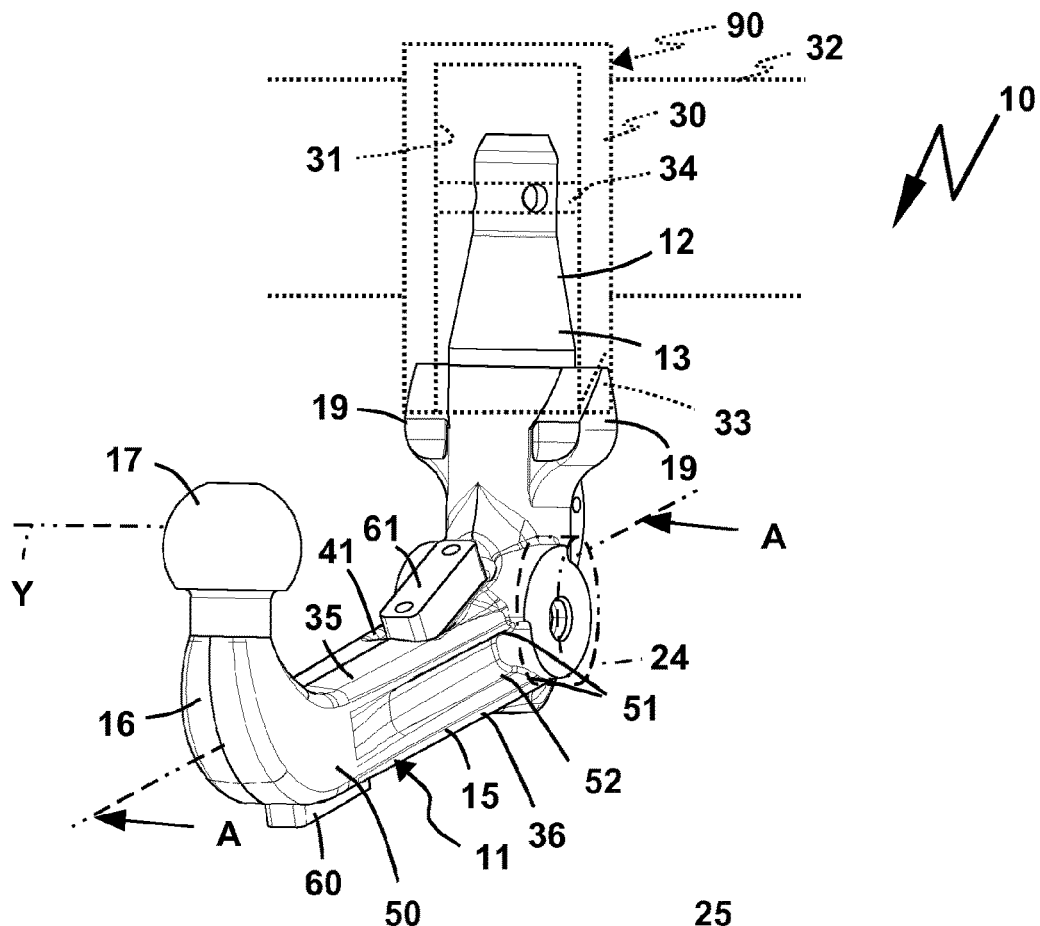
FIG. 1 a perspective oblique view of a first coupling arm

Shown in the drawing are several, partly similar trailer couplings. To the extent that the components are identical or similar, the same reference numbers are used, partly with reference numbers differing by 100 in each case.

A trailer coupling 10, 110, 210, 310 includes a coupling arm 11, 111, 211, 311, wherein each of these coupling arms has here a similar basic geometry, explained below by the example of coupling arm 11. This basic geometry is however to be understood as only by way of example, i.e. within the scope of the invention, other coupling arms of quite different geometry may be designed readily and according to the invention, for example substantially straight, rod-like coupling arms, coupling arms with other or different curve radii or the like.

A vehicle section 12 of the coupling arm 11 serves for connection to a vehicle mounting 30, 330 which is fixed to the motor vehicle 90. For example the vehicle mounting 30, 330 is fixed to a cross-member 32 of the trailer coupling 10, 110, 210, 310 extending transversely at the rear of the motor vehicle 90. The cross-member 32 is joined to the body of the motor vehicle 90, for example by means of side members, not shown, extending at the side along the rear wings of the motor vehicle 90.

Extending away from the vehicle section 12 is a curved section 14 which merges into an arm section 15, at the other end section of which a further curved section 16 is in turn provided. At the free end section of the curved section 16 is a coupling element 17, here for example in each case a coupling ball 18.

In the case of the trailer couplings 10, 110, 210, each vehicle section 12 is designed as an insertion end 13, provided for insertion into or attaching on to the vehicle mounting 30. Consequently, the coupling arm 11, 111, 211 may be connected releasably to the vehicle mounting 30, namely with the aid of a plug connection, essentially known.

The insertion end 13 may be inserted in a location 31 of the vehicle mounting 30 in the form of a plug-in socket, for example comprising a sleeve. The vehicle mounting 30 is, as explained, fixed to the cross-member 32.

Figure 2:
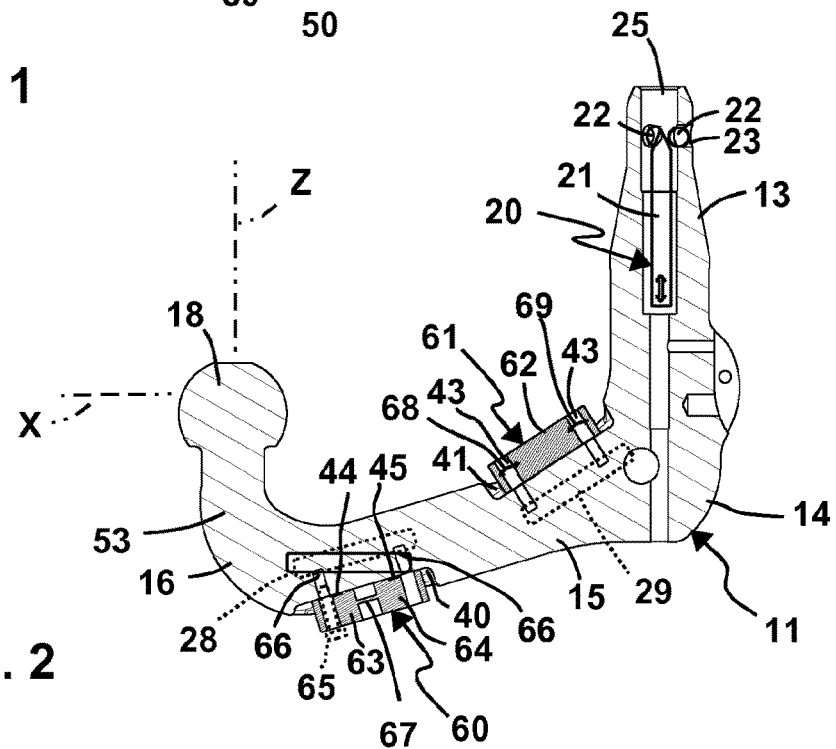
FIG. 2 a cross-section view of the coupling arm according to FIG. 1, roughly along the section line A-A FIG. 3 a perspective oblique view of a second coupling arm, which in FIG. 4 is shown from above FIG. 5 a perspective oblique view of a third coupling arm, which in FIG. 6 is shown from below and in FIG. 7 is shown in a cross-section view along a section line B-B in FIG. 6
Figure 3:
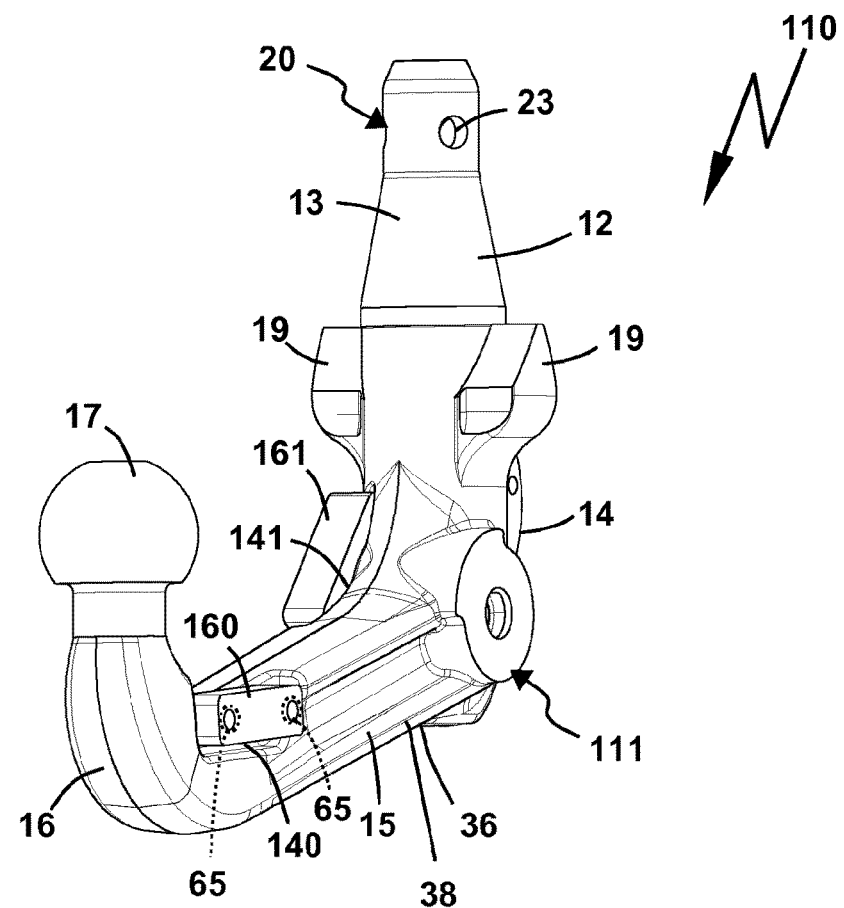
Figure 4:
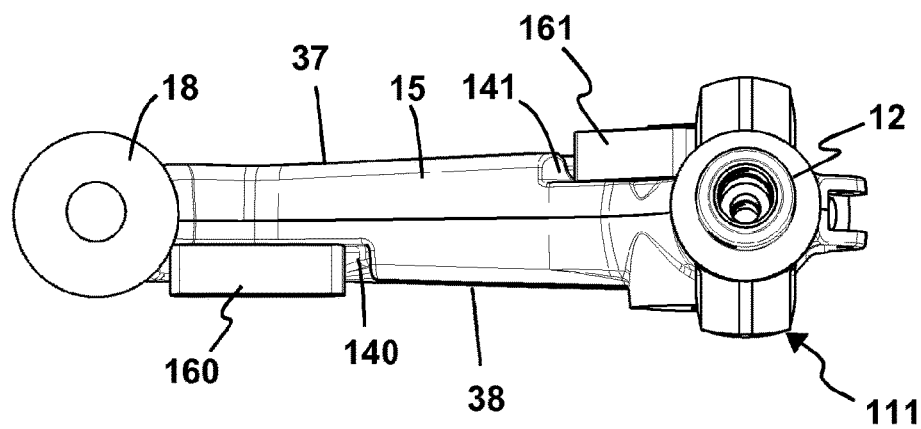
Figure 8:
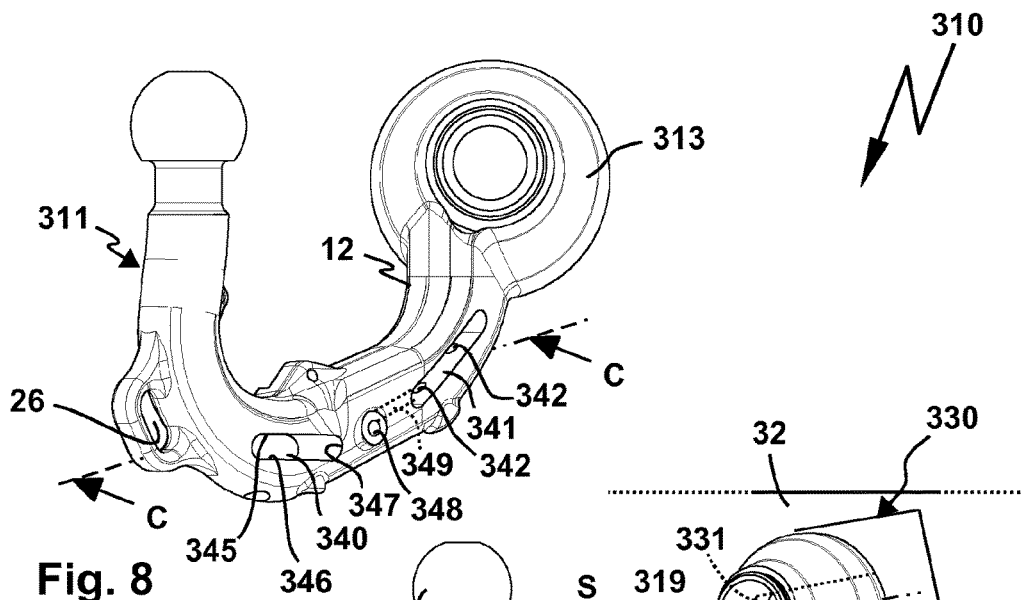
FIG. 8 a first.
Figure 9:
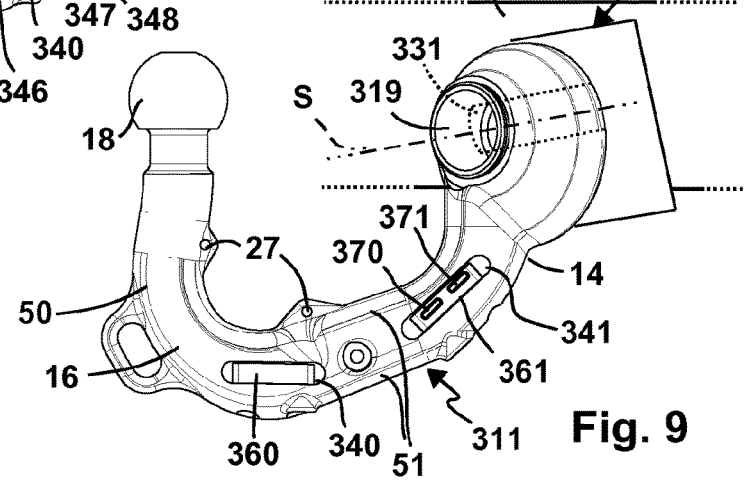
Figure 10:
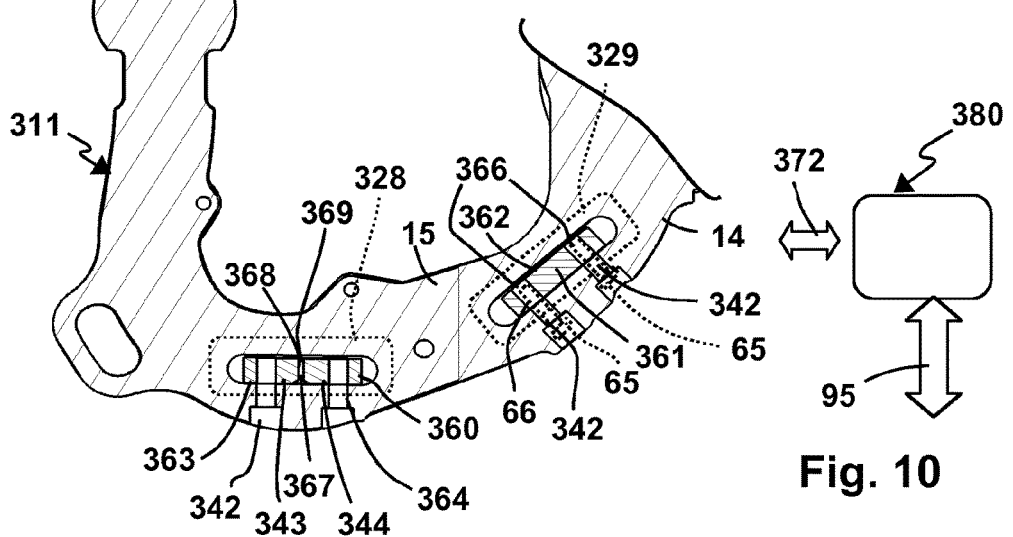
FIG. 10 shows a cross-section view along a section line C-C in FIG. 8.

For a positive hold, wedge chamfers 19 for example engage at the base section of the insertion end 13 in corresponding form-fitting locations on the vehicle mounting 30. In an essentially known manner, the coupling arm 11, 111, 211 is locked to the vehicle mounting 30 with the aid of a locking device 20. For example in the vehicle section 12, in a guide 25, a displacer body 21, for example a so-called locking pin, is mounted with linear movement capability (indicated by a double arrow in FIG. 2). It is able to displace form-fitting bodies 22, for example balls which are held movably in guides 23, radially outwards into a corresponding form-fitting location 34, for example into an annular slot or into corresponding domes. If the displacer body 21 in the drawing is moved downwards, then the balls or form-fitting bodies 22 are able to fall radially inwards, so that they are moved out of the form-fitting location 34 and the insertion end 13 may be removed from the location 31. The displacer body 21 may be actuated for example with the aid of a hand wheel, a lever or other actuating element 24.

A locking facility, for example of this kind, is also expediently provided for the trailer coupling 310, in a manner not illustrated. Its coupling arm 311 is however not fastened releasably to the vehicle-side vehicle mounting 330, but instead is mounted movably on the vehicle mounting 330. The vehicle mounting 330 has for example a bearing element, e.g. a bearing projection 331, on which the vehicle section 12 of the coupling arm 311 is movably mounted, in this case so as to be rotatable. The bearing projection 331 engages for example in a bearing location 319 on the vehicle section 12. The coupling arm 311 is therefore able to swivel around a swivel axis S between a position of use (shown in the drawing) and an inoperative position, in which it is shifted closer to the rear of the motor vehicle 90, for example moved back behind the rear bumper or the rear apron or the like. At any rate, in the position of use, the coupling arm 311 extends further from the rear of the motor vehicle 90 than in the inoperative position.

At this point it should be noted that of course trailer couplings which remain permanently on the motor vehicle and are not movable, may be designed in accordance with the invention.

Also provided on the coupling arm 311 is an eye 26 for a breakaway cable, together with a location or holder 27 for a socket, not shown, through which the trailer, similarly not shown, may be supplied with electrical power. These measures may of course also be provided for the coupling arms 11, 111, 211.

The coupling arm 11 has a recess 40 and a recess 41, in which sensors 60, 61 are provided.

The recesses 40, 41 extend inwards from a an outer peripheral contour 50 of the coupling arm 11, i.e. into the body 53 or core of the coupling arm 11. The recesses 40, 41 are not such recesses as form for example between reinforcing ribs 51, for example a side recess 52, but rather recesses dedicated for the sensors 60, 61.

The recess 40 is provided at the front, in the transition zone between the arm section 15 and the curved section 16. The recess 40 is to be found on the side (lower side 36) of the coupling arm 11 which is lower when the coupling arm 11 is in use.

The recess 41 is provided on the side (upper side 35) of the coupling arm 11 which is uppermost during use of the coupling arm 11, and is close to the curved section 14. The recess 41 is as it were located on or extends away from the inner side or inside radius of the curved section 14.

In the area of the recesses 40, 41, when the coupling arm 11 is loaded by a nose weight, acting for example in the direction of a Z-axis, an especially strong deformation of the coupling arm 11 is to be noted. But also under a tensile load, i.e. in the direction of an X-axis, the coupling arm 11 is deformed especially strongly in the area of the recesses 40, 41.

Each of the sensors 60, 61 has a sensor housing 62, in which are located a first sensor part 63 and a second sensor part 64. Other components of the sensors 60, 61, for example evaluation means, for example suitable evaluation electronics, transmission means, wiring and the like are not shown in the drawing for reasons of simplification. The sensor housings 62 are connected to the coupling arm 11 by means of mounting bolts 65, for example screws, which penetrate through openings 66 of the sensors 60, 61 and into recesses 42 which extend away from the recesses 40, 41. The recesses 42 have for example a screw thread or latching contours. Instead of the mounting bolts 65 in the form of screws, for example latching projections, for example fir-tree-shaped or other latching projections with latching hooks, may be provided.

The sensor parts 63, 64 are movable relative to one another in the sensor housings 62. It is for example possible for the sensor housings 62 to be suitably flexible, or to allow the facility for movement of the sensor parts 63, 64 in other ways. The sensor housing 62 is shown simplified with continuous shading, with the sensor 61 and the sensor 62 being for example of identical design.

The sensor parts 63, 64 are joined together by the sensor element 67. The sensor element 67 is for example a strain gauge or other similar sensor element which is able to determine a relative distance between the sensor parts 63, 64.

The screw connection with the mounting bolts 65, for example screws, provides a firm hold and contact between the sensors 60, 61 and the recess 41, 40. In particular contact faces 43, 44 of the sensor parts 63, 64 are in direct and firm contact with opposite locating surfaces on the base of the recess 40, 41.

An advantageous embodiment provides for the mounting bolt 65 to act perpendicular to the contact faces 43. 44, i.e. the contact faces and the longitudinal axes of the recesses 43 are at right-angles to one another.

In addition, the recesses 42 forming screw sockets extend as far as the core areas 28, 29 of the coupling arm 11. Consequently, a deformation of the coupling arm 11 in these core areas 28, 29 is transferred as it were over the threaded bolts, which to a certain extent represent probes, to the sensors 60, 61. The movements of the sensor parts 63, 64, representing as it were a certain swivel movement caused by the deformation of the coupling arm 11, is indicated by arrows 68, 69 in the drawing (only for sensor 61).

The measuring principle described, involving the sensors 60, 61, may also be used for the coupling arm 111, which represents as it were a variant of the coupling arm 11. There however the recesses 140, 141, which are arranged similarly to the recesses 40, 41 on the curved sections 16, 14, are located not on the upper side 35 and the lower side 36, but instead on the long sides 37, 38.

In particular in respect of the sensor 160, which is located furthest from the rear of the motor vehicle 90 and is close to the coupling element 17, this may be somewhat more protected by this measure, for example if the coupling arm 111 touches or rests on the ground.

A special benefit is obtained at any rate by the fact that the sensors 160, 161, other than the sensors 60, 61, extend even further into the curved sections 16, 14, for example completely covering them to a substantial degree. The sensors 60, 61 are substantially located on the straight-running arm section 15, whereas the sensors 160, 161 extend further into the curved area of the curved sections 14, 16. Precisely in the area of the curved sections 14, 16, however, the deformation of the coupling arm 111 is especially strong, i.e. the sensors 160, 161 are even better able to detect a deformation of the coupling arm 111 under stress from an acting load, for example a load carrier or a trailer.

The sensors 160, 161 are for example also screwed by means of screws 65 to the coupling arm 11.

In the case of the coupling arm 211 of the trailer coupling 210, recesses 240, 241 are located, as for the aforementioned coupling arms 11, 111, in the area of the curved sections 16, 14. Sensors 260, 261, for example strain gauges, are held in the recesses 240, 241. The sensors 260, 261 are for example bonded to contact faces 243, 244 of the recesses 240, 241.

The contact faces 243, 244 are provided by or on base areas 245, 249 of the recesses 240, 241.

The recess 241 is provided on the upper side 35 of the coupling arm 211, as it were in the inner bend or in the inside radius of the curved section 14. The recess 241 is a trough, of relatively low depth, which weakens the coupling arm 211 in the area of the curved section 14 to only a minimal extent. Nevertheless, the sensor 261 is held with protection. For example, side shoulders 39 extend upwards in front of the recess 241 and therefore also in front of the sensor 261, so that the latter is as it were held protected between the shoulders 39.

The recess 240 also provides optimal protection for the sensor 260 which it holds. The recess 240 extends from the outside radius of the curved section 16 in the direction of the inside radius, i.e. from the lower side 36 to the upper side 35 of the coupling arm 211.

Side walls 247, 248 of the recess 240 extend therefore almost through the entire cross-section of the coupling arm 211 from the lower side 36 to the upper side 35 of the coupling arm 211, wherein however one wall 246 still remains standing, forming the base of the recess 240. The wall 246 is as it were the remains of the upper-side material of the coupling arm 211 which, despite "hollowing out" by the recess 240, remains standing. Consequently, therefore, the wall 246 is almost a kind of membrane, which reacts very sensitively to deformations of the coupling arm 211 due to responsive loading, for example a nose weight (a load acting in the Z-direction), a tensile load (a load acting in the X-direction), or both. Even a twisting force on the coupling arm 211 acts on the membrane or wall 246) relatively strongly. The sensor 260 is connected to the wall 246 and is therefore well able to detect its movements and/or deformations.

The wall 246 is here integral with the material of the coupling arm 211. At any rate it is firmly joined to edge areas of the recess 240, namely the side walls 247, 248, which in principle form parts of a continuous inner peripheral contour, so that movements of these edge areas are transmitted directly to the wall 246 and therefore deform the latter, for example through compression, stretching or twisting.

A further advantageous effect is due to the fact that the coupling arm 211 is to a large extent weakened in the area of the recess 240, leading to an especially powerful deformation under loading. This too may be detected by the sensor 260 advantageously and effectively.

For further protection of the sensor 260, the recess 240 may be closed by a cover 242. The cover 242 is for example in the form of a plug. Advantageously the plug is in contact with the side walls 247, 248, i.e. with the inner periphery of the recess 240.

At this point it should be noted that a recess according to the invention may also be closed by a sealing compound.

In the case of the trailer coupling 310, sensors 360, 361 are accommodated in recesses 340, 341. The recesses 340, 341 are located in the area of the curved sections 16, 14.

In the recesses 340, 341, the sensors 360, 361 are almost completely protected. The sensors 360, 361 are, like the sensors 60, 61, in the form of sensor modules, i.e. they may be inserted in the respective recesses 340, 341 (40, 41, 140, 141) as a complete component. Unlike the sensors 60, 61, however, the sensors 360, 361 are fully protected in the recesses 340, 341.

The recesses 340, 341 are located in core areas 328, 329 of the coupling arm 311, as it were "in the heart" or core of the coupling arm 311. It is here that especially strong deformations of the coupling arm 311 are to be found under loading from nose weight and/or tensile loads acting on the coupling arm 311.

The recesses 340, 341 have in each case an elongated shape. The recesses 340, 341 are open at one or both of the long sides 37, 38. Here the recesses 340, 341 are in the form of through openings, but there would be no problem in having a recess 340, 341 which was pocket-like or in the form of a blind hole, for example only to one side. The design of the recesses 340, 341 as through holes has however the advantage that the coupling arm 311 as it were over its entire cross-section has the same load-bearing capacity, therefore the same deformation is also to be observed.

Away from the recesses 340, 341, further recesses 342 extend as far as the outer periphery of the coupling arm 311, for example to the lower side 36. Consequently, mounting bolts or screws 65, i.e. connecting elements, may be screwed in from the outer periphery or the external contour of the coupling arm 311, through the recesses 342 (by way of example 2 are provided) into screw sockets 366 on the sensor housing 362 of the sensors 360, 361, wherein they clamp sensor parts 363, 364 to contact faces 343, 344 of the recesses 340, 341. The sensor housings 362 thus form for example tie rods, which are as it were clamped in the interior of each recess 340, 341. The screw sockets 366 may also for example have latching contours for hooking or latching of the mounting bolts 65.

The recesses 340, 341 have for example a base wall face 346, a top surface 345, and side faces 347 extending between the former. The sensor housings 362, and so the sensors 360, are in contact with the base surface 346, where the aforementioned contact faces 343, 344 are to be found.

An advantageous measure is represented by the sensor housing 362 also making contact with other surfaces in the interior of the recess 340 or 341, i.e. it is held positively in the recess 340, 341. It would for example be conceivable for each sensor housing 362 to have a somewhat greater outer periphery, in particular also curves for direct contact with the side faces 347 externally at the side, for altogether form-fitting location. Clamping to the contact faces 343, 344 would then also be possible without further ado.

Here the sensors 360, 361 are for example of identical design. The sensors 360, 361 may be of the same design as the sensors 60, 61. Here, however, a different for example inductive, optical or, as explained below, capacitive measuring principle is provided for the sensors 360, 361.

The two sensor parts 363, 364 are each clamped by a screw 66 to the respective contact face 343, 344. If then the coupling arm 311 undergoes deformation, for example due to a nose weight (a load acting in the Z-direction), a tensile load (a load acting in the X-direction) and/or a load acting from the side (a load acting in the Y-direction), the sensor parts 363, 364 move towards or away from one another. This makes a gap 367, which exists between opposing sensor faces 368, 369 of the sensor parts 363, 364, greater or smaller, i.e. the distance between the sensor faces 368, 369 becomes greater or smaller.

An optical or inductive sensor or a sensor element, for example, could be provided for measuring a distance between the sensor faces 368, 369 or more generally formulated between the sensor parts 363, 364.

Here however a capacitive measurement is provided, in which for example the sensor faces 368, 369 represent capacitive surfaces. For example the sensor face 368 forms a passive capacitive surface and the sensor face 369 the active capacitive surface. For example the sensor faces 368, 369 are as it were capacitor surfaces.

If the coupling arm 311 undergoes deformation, the contact faces 343, 344 move towards or away from one another or undergo relative curvature. This makes the gap 367 narrower or wider or also deforms its geometry, for example by making the capacitor surfaces or sensor faces 368, 369 stand at an angle or parallel to one another.

From one or both of the recesses 340, 341 there extends for example a passage 349 which at one end is open to the recess 341 or 340 and at the other end has an opening 348 leading to the outside. An electrical line leading to each sensor 360, 361 may be guided through the passage 349.

It is also possible (not shown in the drawing) for the recesses 340, 341 for example to be connected to one another by a passage, so that the sensors 360, 361 are electrically and/or optically connected to one another, for example for common signal transmission, a central evaluation unit 370 and/or transmission unit 371, which might be provided on one of the sensors lower side 360 or 361, or the like.

The evaluation unit 370 evaluates for example signals 372 which are formed by change of capacitance between the sensor faces 368, 369, and emits these signals with the aid of the transmission unit 371, in particular after prior filtering, matching to a characteristic curve, or the like. The relevant signals 372 are an indication of deformation of the coupling arm 311 by for example nose weight, tensile loading or forces acting transversely to the coupling arm 311 (transversely to the vehicle axial direction or in the lateral direction of the motor vehicle 90).

For example the transmission unit 371 sends or transmits the signals 372 by wireless or wired means to a coupling-on device connected to a vehicle-side electrical system 95 of the motor vehicle 90 and which is for example a trailer control unit 380, which may be used to control and/or monitor other functions of the trailer coupling 10-310, for example to supply a trailer socket with power or to monitor the function of lighting the trailer or load carrier.

The sensor housing 362 is relatively voluminous. Naturally, board-like sensor housings or sensor may also be used advantageously within the scope of the invention. Such sensors may be for example like a disc or similar pushed into a slot, i.e. a narrow recess in the coupling arm.

The invention claimed is:

1. A sensor module for a trailer coupling for a motor vehicle, which has a coupling arm for attaching a trailer or for supporting a load carrier, wherein the sensor module comprises:
a sensor module housing for mounting on the coupling arm to detect deformation of the coupling arm by a load acting on the coupling arm, wherein the sensor module housing has an outer peripheral contour which is matched to at least one inner peripheral contour of a recess, provided on an outer peripheral contour of the coupling arm, in or on which the sensor module housing is mounted or held;
a first sensor part contained within the sensor module housing; and
a second sensor part contained within the sensor module housing, wherein the first and second sensor parts are disposed at a distance from one another, but are movable with respect to one another within the sensor module housing during deformation of the coupling arm.

2. A trailer coupling for a motor vehicle for attaching a trailer or supporting a load carrier, the trailer coupling comprising:
a coupling arm provided with a coupling element for coupling-on the trailer or load carrier, the coupling arm having an outer peripheral contour and at least one recess formed in the outer peripheral contour; and
a sensor mounted within the at least one recess on the coupling arm for detecting a deformation of the coupling arm due to a load acting on the coupling arm, wherein the sensor has a first sensor part and a second sensor part, wherein the first and second sensor parts are each connected to the coupling arm at a distance from one another, and making a relative movement towards one another during deformation of the coupling arm, wherein the sensor is not in contact with the coupling arm between the sensor parts,
wherein the first and second sensor parts are contained within a common sensor housing for protecting the first and second sensor parts from environmental influences.

3. The trailer coupling according to claim 2, wherein the sensor is further protected from environmental influences by a cover or lid at least partly covering the recess.

4. The trailer coupling according to claim 2, wherein the sensor is clamped to the surface of the coupling arm in the area of the recess, or connected or bonded to the surface.

5. The trailer coupling according to claim 2, wherein the first and second sensor parts have electrically capacitive surfaces lying opposite one another and/or interacting.

6. The trailer coupling according to claim 2, wherein at least two recesses are provided on the coupling arm at a distance from one another, wherein the sensor is mounted within a first recess and a second sensor is connected to the coupling arm in or at a second recess, so that the sensor may be actuated by a relative movement of the two recesses towards one another.

7. The trailer coupling according to claim 6, wherein a location or mounting for a sensor housing of the at least one sensor, in the form of a recess, extends between the recesses.

8. The trailer coupling according to claim 2, wherein the recess extends from the outer peripheral contour as far as a central area, up to a centre of a cross-section, of the coupling arm in the area of the recess and the sensor is connected to the coupling arm, in the section of the recess extending into the central area, so that a deformation of the central area leads to actuation of the sensor.

9. The trailer coupling according to claim 2, wherein the sensor is provided to detect a deformation of a knee-joint bar outside the neutral phase or neutral fibre of the coupling arm and/or the recess reduce the mechanical loadability of the coupling arm in the area of the recess and/or the recess and the sensor are provided on a curved section of the coupling arm.

10. The trailer coupling according to claim 2, wherein edge areas of the recess lying opposite one another are joined together by the sensor and/or by a wall carrying the sensor, permanently joined to or integral with the edge areas, in the manner of a membrane.

11. The trailer coupling according to claim 2, wherein the sensor has a capacitive sensor element and/or an inductive sensor element and/or a strain gauge and/or a distance sensor and/or a sensor housing, in which at least one strain gauge or a capacitive measuring surface is mounted with protection from environmental influences.

12. The trailer coupling according to claim 2, wherein the recess has a longitudinal shape extending along an axial direction of the coupling arm or at an angle to an axial direction of the coupling arm and/or communicate with at least one location for a mounting bolt holding the sensor in the recess and/or a passage for a line leading to the sensor.

13. The trailer coupling according to claim 2, wherein the recess has a location holding the sensor away from which at least one bolt location for a mounting bolt for mounting the sensor extends as far as the external contour of the coupling arm, wherein the mounting bolt is connected to the sensor passing through the bolt location from the external contour.

14. The trailer coupling according to claim 2, wherein the recess includes a through hole passing through the coupling arm and/or a blind hole or a pocket and/or a trough and/or a screw socket for screwing or a latching location for latching the sensor to the coupling arm.

15. The trailer coupling according to claim 2, wherein the first and second sensor parts are discrete and not connected to one another, and wherein the first and second sensor parts have electrically capacitive surfaces lying opposite one another and interacting.

16. A trailer coupling for a motor vehicle for attaching a trailer or supporting a load carrier, the trailer coupling comprising:
- a coupling arm provided with a coupling element for coupling-on the trailer or load carrier, the coupling arm having an outer peripheral contour and at least one recess formed through the coupling arm such that the at least one recess is open on opposite surfaces of the outer peripheral contour to form a through opening in the coupling arm;
- a sensor mounted within the at least one recess on the coupling arm for detecting a deformation of the coupling arm due to a load acting on the coupling arm; and
- at least one connecting element inserted from the outer peripheral contour of the coupling element into the at least one recess in a direction perpendicular to a central axis of the through opening for clamping the sensor to a contact face of the through opening.

17. The trailer coupling according to claim 16, wherein the sensor has a first sensor part and a second sensor part, wherein the first and second sensor parts are each connected to the coupling arm at a distance from one another, and making a relative movement towards one another during deformation of the coupling arm, wherein the sensor is not in contact with the coupling arm between the sensor parts.

18. The trailer coupling according to claim 17, wherein the first and second sensor parts are connected to one another by at least one strain gauge or a sensor housing, or the sensor parts are discrete and not connected to one another.

\* \* \* \* \*